United States Patent
Lloyd

(10) Patent No.: US 7,322,567 B2
(45) Date of Patent: Jan. 29, 2008

(54) AIR SPRING ASSEMBLY

(75) Inventor: Jeffrey Lloyd, Auburn Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 413 days.

(21) Appl. No.: 10/850,258

(22) Filed: May 20, 2004

(65) Prior Publication Data

US 2005/0258579 A1    Nov. 24, 2005

(51) Int. Cl.
*F16F 9/04* (2006.01)

(52) U.S. Cl. ................ 267/64.21; 188/322.19

(58) Field of Classification Search ........... 267/122, 267/64.24, 64.27, 64.19, 64.21, 64.23; 280/124.157; 92/98 D; 244/100 R; 188/322.19; 29/436, 29/454

See application file for complete search history.

(56) References Cited

U.S. PATENT DOCUMENTS

| | | | | |
|---|---|---|---|---|
| 2,874,458 | A * | 2/1959 | Smith | 29/436 |
| 2,933,308 | A * | 4/1960 | McGavern, Jr. et al. | 267/256 |
| 2,933,908 | A * | 4/1960 | Thore | 66/147 |
| 3,870,286 | A * | 3/1975 | Willich | 267/64.24 |
| 4,555,096 | A * | 11/1985 | Pryor | 267/64.21 |
| 4,564,177 | A | 1/1986 | Leonard | |
| 4,629,170 | A | 12/1986 | Warmuth, II | |
| 4,655,438 | A * | 4/1987 | Cameron | 267/220 |
| 4,762,308 | A | 8/1988 | Geno | |
| 4,802,657 | A | 2/1989 | Wijnhoven et al. | |
| 4,921,226 | A * | 5/1990 | Pees | 267/64.24 |
| 5,135,203 | A | 8/1992 | Wijnhoven et al. | |
| 5,253,850 | A | 10/1993 | Burkley et al. | |
| 5,518,225 | A * | 5/1996 | Gubitz | 267/64.24 |
| 5,667,203 | A * | 9/1997 | Romer | 267/64.23 |
| 5,752,692 | A | 5/1998 | Crabtree et al. | |
| 5,931,451 | A * | 8/1999 | Onami | 267/64.24 |
| 6,336,610 | B1 * | 1/2002 | Wode | 244/100 R |
| 6,343,781 | B1 * | 2/2002 | Joseph | 267/64.11 |
| 6,412,758 | B1 | 7/2002 | Wenzel et al. | |
| 6,619,635 | B1 | 9/2003 | Hilburger et al. | |
| 2004/0140600 | A1 * | 7/2004 | Brehm et al. | 267/64.23 |

FOREIGN PATENT DOCUMENTS

| | | | |
|---|---|---|---|
| GB | 1249532 | * | 10/1971 |
| WO | WO 02/40888 A1 | * | 5/2002 |

* cited by examiner

*Primary Examiner*—Xuan Lan Nguyen
(74) *Attorney, Agent, or Firm*—Carlson, Gaskey & Olds

(57) ABSTRACT

An air spring assembly is mounted to a shock absorber to form a strut assembly. The shock absorber includes an outer cylinder with an internal piston and piston rod mounted within the outer cylinder. The piston rod is mounted to a vehicle frame member and the outer cylinder is mounted to a vehicle wheel. The air spring assembly includes a flexible member and an air spring piston that is supported by the outer cylinder. One end of the air spring piston is crimped around the flexible member to form a sealed attachment interface between the outer cylinder and the flexible member.

8 Claims, 2 Drawing Sheets

AIR SPRING ASSEMBLY

TECHNICAL FIELD

The subject invention relates to an air spring assembly including an air spring piston that is crimped around a flexible member to seal the flexible member to a shock body.

BACKGROUND OF THE INVENTION

An air spring assembly is mounted to a shock absorber to form a strut assembly. The strut assembly is mounted between a vehicle wheel and a vehicle frame member. The strut assembly dampens road load inputs to a vehicle to improve passenger ride and comfort.

The air spring assembly includes an air spring piston supported by the shock absorber, a flexible member, and a retainer member. The flexible member is mounted at one end to the air spring piston and at an opposite end to the retainer member to form a fluid cavity. The shock absorber includes an outer cylinder having an internal piston and piston rod mounted within the outer cylinder. One end of the piston rod is attached to the internal piston and an opposite end of the piston rod is attached to the retainer member.

Attachment of the air spring assembly to the shock absorber typically involves crimping the flexible member to the air spring piston with a retaining component. The air spring piston is then attached and sealed to the shock absorber. This process involves multiple assembly steps, requires a retaining component to hold the flexible member to the air spring piston, and requires a separate sealing assembly to form a sealed interface between the air spring piston and the shock absorber. These several steps increase assembly time and cost. Additionally, there is increased risk of leakage because there are multiple sealing interfaces, i.e. sealing interfaces between the air spring piston and the flexible member and between the air spring piston and the shock absorber.

It would be beneficial to provide an air spring assembly that reduces the number of potential leak areas, and which is more cost effective. The air spring assembly should also be easier to assemble and have fewer required assembly components, as well as overcoming other known deficiencies.

SUMMARY OF THE INVENTION

An air spring assembly includes an air spring piston and a flexible member that is sealed against a shock absorber body by deforming the air spring piston against the flexible member. In this configuration, the flexible member is positioned between the air spring piston and the shock absorber body at a seal interface.

In one disclosed embodiment, the shock absorber body comprises an outer cylinder of a shock absorber assembly. A piston and piston rod are mounted within the outer cylinder. One end of the piston rod is attached to the piston and an opposite end of the piston rod is mounted to a vehicle frame member. The outer cylinder is mounted to a vehicle wheel. The air spring assembly and the shock absorber assembly together form a strut assembly that is used to dampen road load inputs transferred from the vehicle wheel to the vehicle frame member.

In one disclosed embodiment, the air spring piston is crimped against the flexible member to seal the flexible member to the shock absorber body. The flexible member has an outer surface and an inner surface. The air spring piston directly engages the outer surface and the shock absorber body directly engages the inner surface at the seal interface. This forms a sealed fluid cavity defined by the flexible member. A portion of the sealed fluid cavity is formed between the flexible member and an upper portion of the shock absorber body at a location above the seal interface.

Crimping the air spring piston around the flexible member and against the shock absorber body provides a simple and effective method and apparatus for sealing the air spring assembly to the shock absorber assembly. These and other features of the present invention can be best understood from the following specification and drawings, the following of which is a brief description.

DETAILED DESCRIPTION OF THE PREFERRED EMBODIMENT

Figure 1:
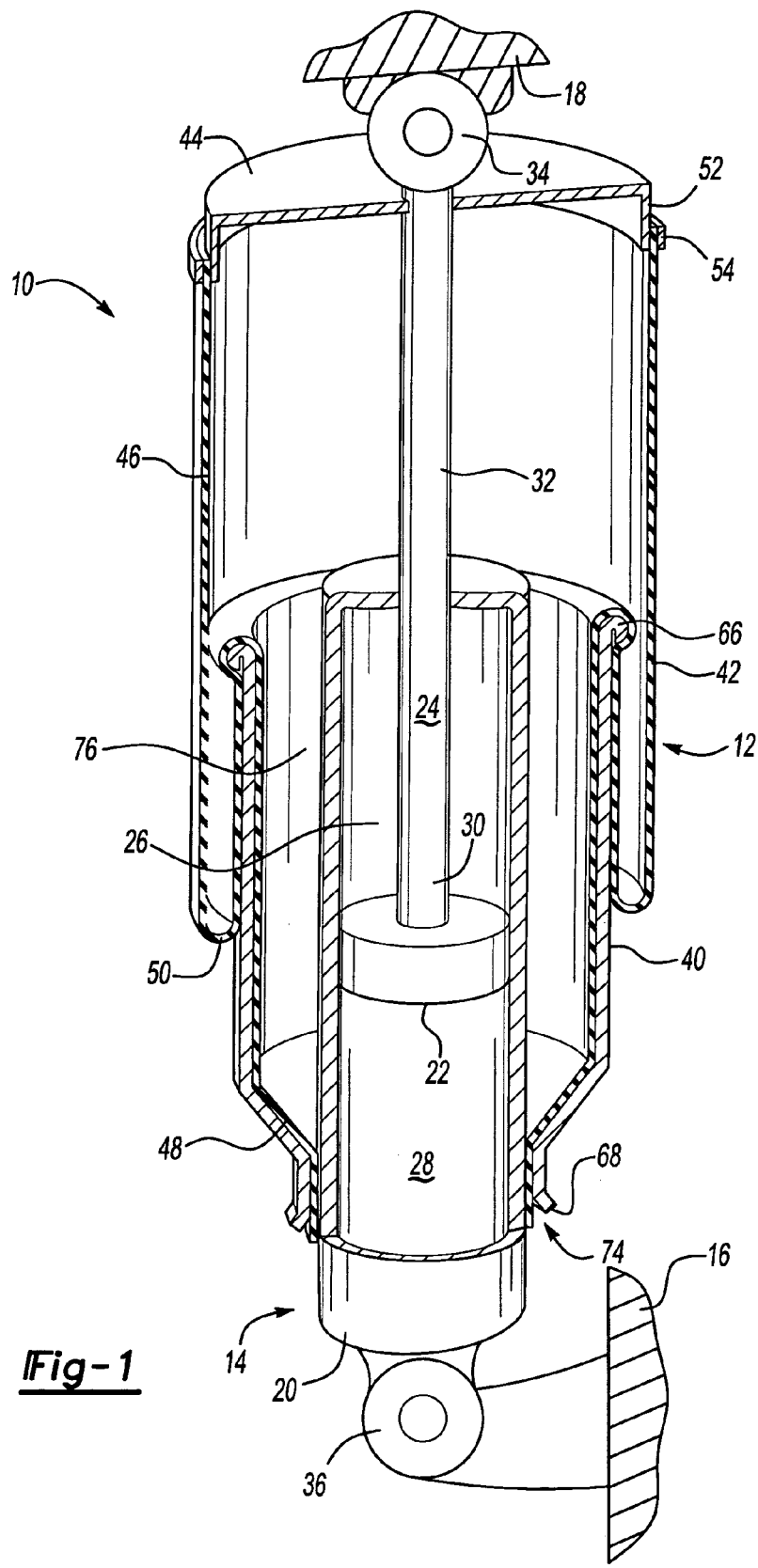
FIG. 1 is a schematic side cross-sectional view of a strut assembly incorporating the subject invention.

A strut assembly 10, shown in FIG. 1, includes an air spring assembly 12 and a shock absorber assembly 14. The strut assembly 10 is positioned between a vehicle wheel 16 and a vehicle frame member 18 to dampen road load inputs.

The shock absorber assembly 14 includes a shock body formed as an outer cylinder 20, a piston 22, and a piston rod 24. The piston 22 is slidably received within the outer cylinder 20 to separate the outer cylinder 20 into first 26 and second 28 chambers. One end 30 of the piston rod 24 is operably connected to the piston 22 and an opposite end 32 of the piston rod 24 includes a first mount 34. A second mount 36 is located on one end of the outer cylinder 20.

In the configuration shown in FIG. 1, the first mount 34 is mounted to the vehicle frame member 18 and the second mount 36 is mounted to the vehicle wheel 16. It should be understood that a reverse configuration could also be used with the first mount 34 being attached to the vehicle wheel 16 and the second mount 36 being attached to the vehicle frame member 18.

The air spring assembly 12 includes an air spring piston 40, a flexible member 42 (often referred to as an airbag), and a retainer member 44. The retainer member 44 is attached to the piston rod 24 near the first mount 34. The flexible member 42 has an upper end portion 46, a lower end portion 48, and a middle portion 50 extending between the upper 46 and lower 48 end potions. The upper end portion 46 engages an outer surface 52 of the retainer member 44. The flexible member 42 is attached to the retainer member 44. A separate retaining ring 54 is crimped or otherwise similarly attached around the upper end portion 46 to seal the flexible member 42 against the retainer member 44.

Figure 2:
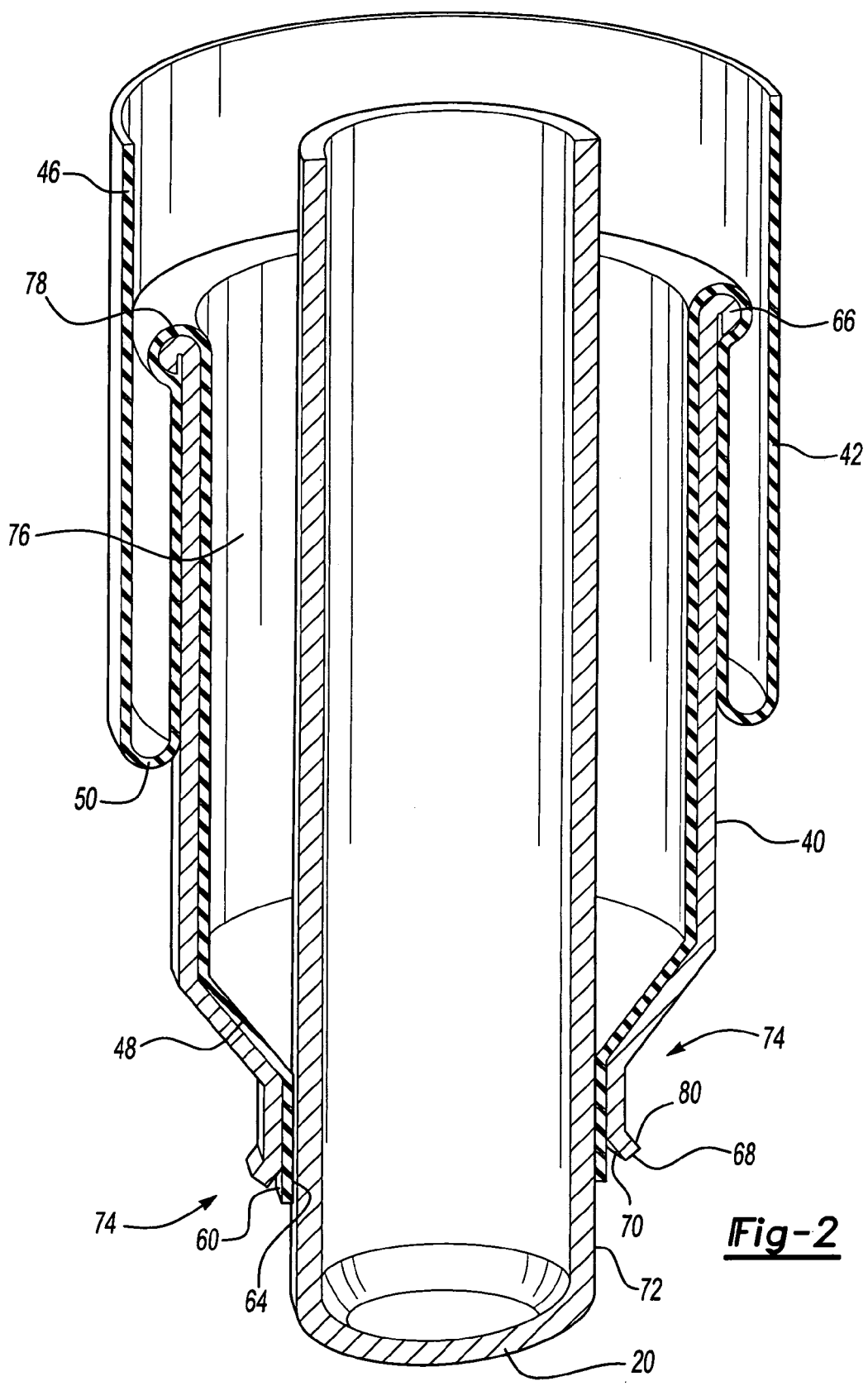
FIG. 2 is an enlarged cross-sectional view showing a seal interface between an air spring assembly and shock absorber assembly that form the strut assembly shown in FIG. 1.

As shown in FIG. 2, the flexible member 42 includes an outer surface 60 and an inner surface 64 that extend between the upper 46 and lower 48 end portions. The air spring piston 40 includes an upper end 66 and a lower end 68. The lower end 68 of the air spring piston 40 substantially surrounds the lower end portion 48 of the flexible member 42. The lower end 68 of the air spring piston 40 is deformed or pressed against the outer surface 60 of the flexible member 42 to seal the lower end portion 48 of the flexible member 42 directly against the outer cylinder 20. Thus, an inner surface 70 of the air spring piston 40 directly engages the outer surface 60 of the flexible member 42 and the inner surface 64 of the flexible member 42 directly engages an outer surface 72 of the outer cylinder 20. This forms a permanent, sealed attachment interface 74 between the air spring piston 40, flexible member 42, and outer cylinder 20.

In one disclosed embodiment, the lower end 68 of the air spring piston 40 is deformed or crimped around the lower end portion 48 of the flexible member 42. However, it should be understood that other similar attachment methods could also be used to deform the lower end 68 of the air spring piston 40 such that an attachment force is exerted against the lower end portion 48 of the flexible member 42 to seal the flexible member 42 to the outer cylinder 20.

A sealed fluid chamber 76 is formed between the flexible member 42 and the outer cylinder 20. This sealed fluid chamber 76 extends along the upper end portion 46, middle portion 50, and the lower end portion 48 of the flexible member 42. Thus, the sealed fluid chamber 76 extends from the sealed attachment interface 74 up to the retainer member 44.

The middle portion 50 of the flexible member 42 extends up and over the upper end 66 of the air spring piston 40. As shown in FIG. 2, the outer surface 60 of the flexible member 42 extends along the entire inner surface 70 of the air spring piston 40. At the upper end 66 of the air spring piston 40, the outer surface 60 of the flexible member 42 extends over a top edge 78 of the air spring piston 40, and engages an outer surface 80 of the air spring piston 40. As the air spring assembly 12 responds to road load inputs, the outer surface 60 of the flexible member 42 moves relative to the outer surface 80 of the air spring piston 40.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An air spring assembly comprising:
   an air spring piston supported by a shock body; and
   a flexible member having a first portion mounted to the shock body at an attachment interface wherein said air spring piston is deformed against said first portion to form said attachment interface.

2. The air spring assembly according to claim 1 wherein said attachment interface comprises a crimped attachment.

3. The air spring assembly according to claim 1 wherein said first portion directly engages the shock body to form a sealed fluid chamber between said flexible member and the shock body.

4. The air spring assembly according to claim 3 wherein said first portion is positioned directly between said air spring piston and the shock body with said air spring piston directly engaging an outer surface of said first portion.

5. The air spring assembly according to claim 1 wherein said air spring piston extends between a first end and a second end wherein said first end directly engages an outer surface of said flexible member and wherein said second end is spaced apart from the shock body.

6. The air spring assembly according to claim 5 wherein said second end has an inner piston surface and an outer piston surface and wherein said flexible member includes a second portion directly engaging both of said inner and outer piston surfaces.

7. The air spring assembly according to claim 1 wherein said flexible member defines a sealed fluid cavity formed at least in part between an outer surface of the shock body and an inner surface of said flexible member.

8. The air spring assembly according to claim 7 wherein said flexible member comprises an airbag with said first portion being directly mounted to the shock body and including a second portion mounted to a retaining member and wherein said sealed fluid cavity extends along the outer surface of the shock body and is enclosed at one end by said attachment interface and at an opposite end by the retaining member.

* * * * *